Patented Dec. 14, 1937

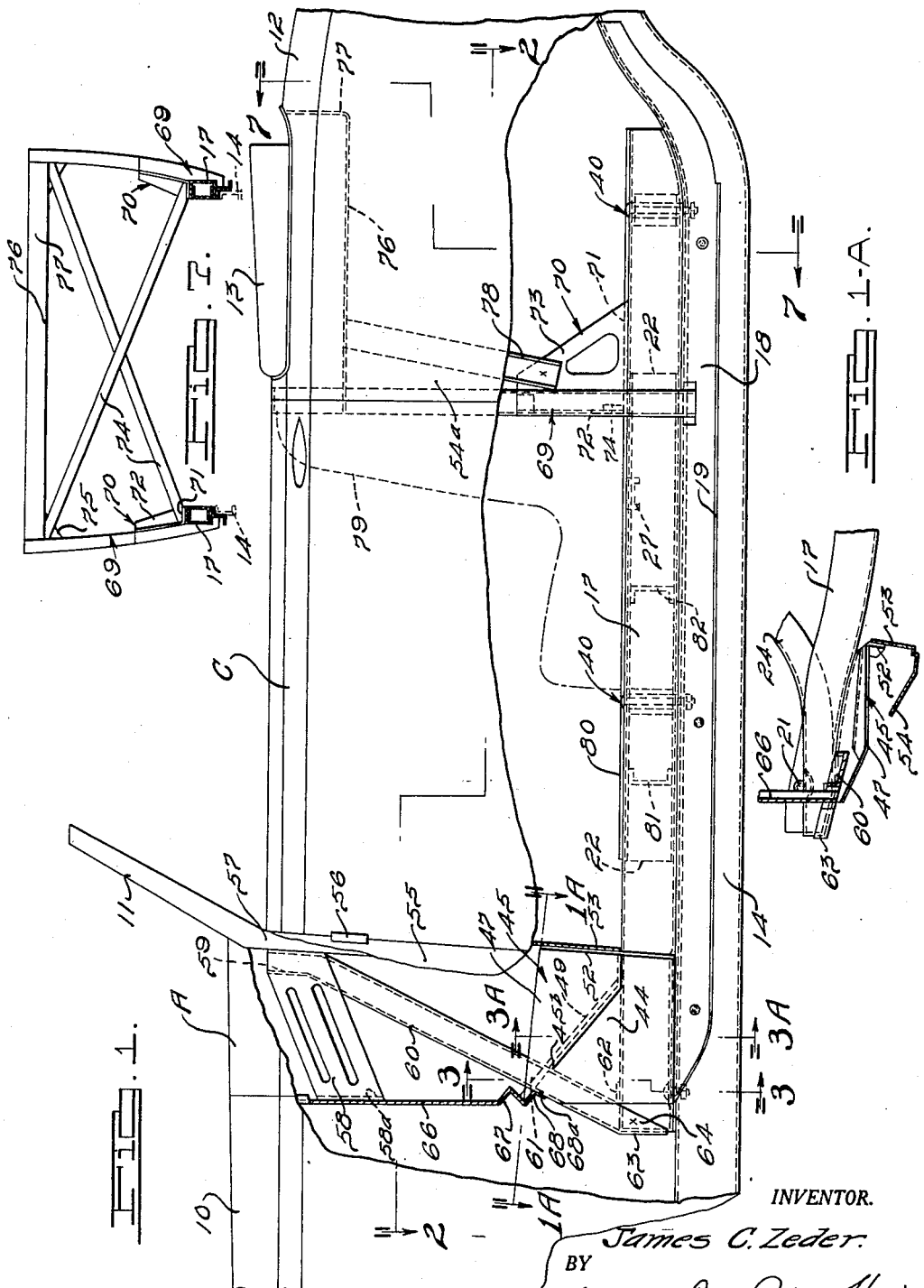

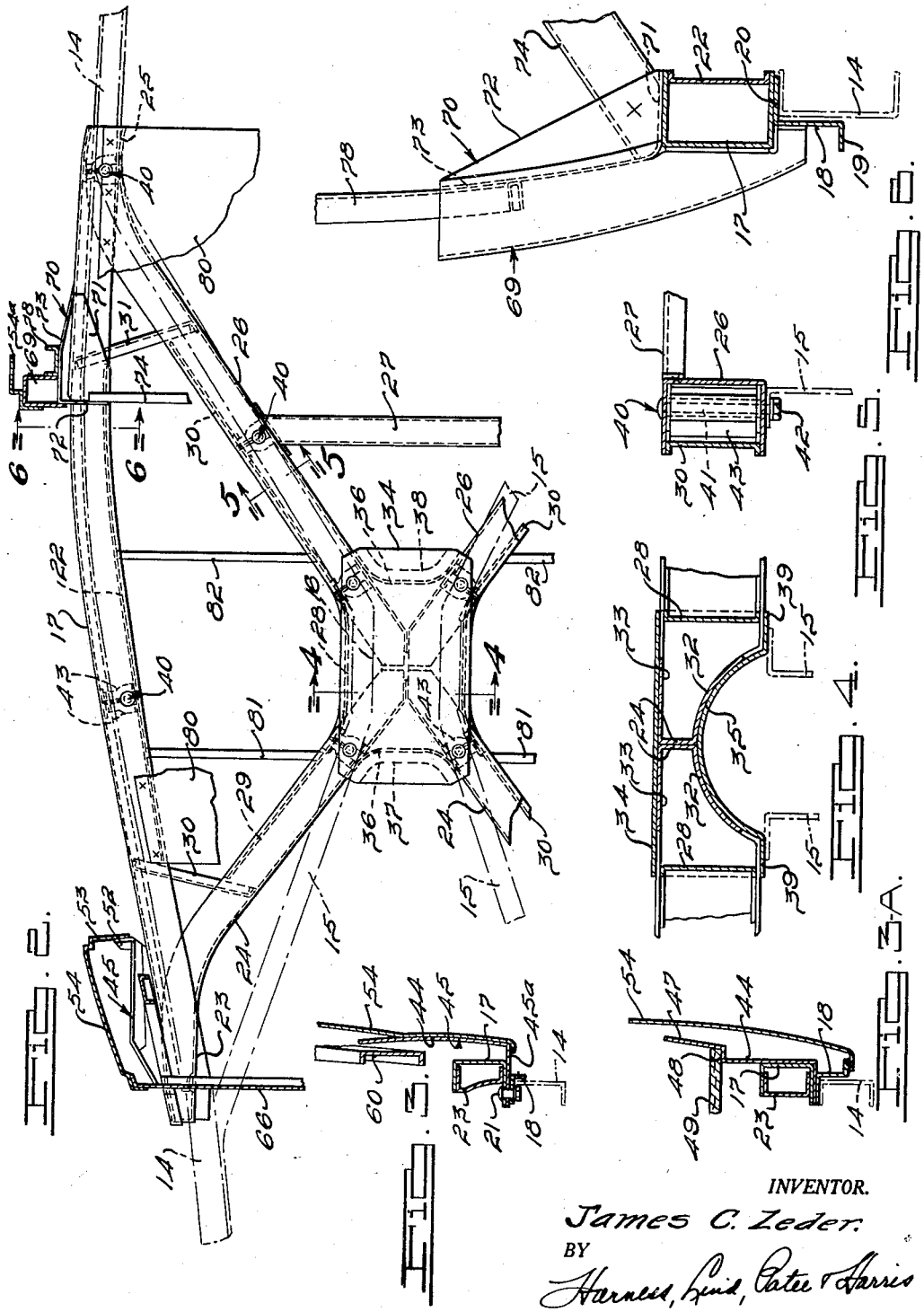

2,102,402

UNITED STATES PATENT OFFICE 2,102,402

MOTOR VEHICLE

James C. Zeder, Detroit, Mich., assignor to Chrysler Corporation, Detroit, Mich., a corporation of Delaware Application January 30, 1935, Serial No. 3,997

12 Claims. (Cl. 296—28)

This invention relates to body structures and refers more particularly to improvements in body structures of motor vehicles.

More specifically my invention has particular reference to body structures of the "open" types as distinguished from the "sedan" or similar closed types although my invention may, if desired, be used to advantage in any type and style of vehicle body.

One type of open body is the well known convertible coupe and it is recognized that such type of body, and other open types, present far less rigidity than the closed types of body structures, especially when the tops are down or off the body.

In the conventional types of sedan or closed body structures the roof panel and body superstructure acts as a shear panel and considerably augments the body frame not only in resistance to loads but also in providing restraint at such a great distance from the center of mass that periodic vibration is eliminated, or favorably diminished.

However, in the conventional convertible body types, for example, with the top down there is no lateral restraint in the open body sections as no diagonal bracing is possible owing to the seating space which must be kept clear of obstructions and therefore it has been considered to be impossible or impracticable to eliminate or desirably reduce the lateral and longitudinal movements between the usual body cowl section and the section to the rear of the seat.

It is an object of my invention to provide an improved open body structure, such as the convertible coupe type for example, constructed to provide the desired lateral and longitudinal restraint to objectionable relative movement between the cowl and rear sections; to provide a practicable rigid open body structure favorably comparing in its rigidity to the sedan body types; and to provide an improved open body structure which will not objectionably weave or distort under normal conditions of usage whereby the body will have a longer life and provide a greater degree of comfort to the passengers than is possible with known structures.

A still further object of my invention resides in the provision of body structures of the character referred to wherein the front and rear portions of the body structure are rigidly connected with a frame brace structure, preferably in the form of an X-brace adapted for mounting on the vehicle chassis frame.

Further objects of my invention are to provide improved means for lending rigidity to the windshield and other parts of body structures of the character referred to.

Further objects and advantages of my invention will be more apparent hereinafter, reference being had to the accompanying drawings illustrating one embodiment of my invention and in which:

Fig. 1 is a side elevational view of a portion of my vehicle body structure with parts of the outer panels broken away to illustrate my bracing means.

Fig. 1A is a detail sectional plan view along line 1A—1A of Fig. 1.

Fig. 2 is a sectional plan view of the bracing structure, the view being taken along the line 2—2 of Fig. 1.

Figs. 3 and 3A are sectional views along the lines 3—3 and 3A—3A respectively of Fig. 1.

Figs. 4, 5, and 6 are detail sectional views respectively along lines 4—4, 5—5, and 6—6 of Fig. 2.

Fig. 7 is a somewhat diagrammatic elevational view of the cross bracing for the rear body portion, the view being taken as generally indicated by the line 7—7 of Fig. 1.

In the drawings the motor vehicle shown for illustrative purposes is a convertible coupe type and is provided with the forward cowl section A and the rear section B. These main sections or body portions provide the usual driver's and passenger's compartment therebetween, one of the side doors for said compartment being illustrated at C in Fig. 1. The forward section A has the engine hood 10 and transverse windshield 11 while the rear section B has the usual deck 12 and accommodates the demountable or folding top 13 when not in use as illustrated in Fig. 1. The top 13 is of any well known construction and is adapted to unfold to provide an enclosure for the driver's compartment in the well known manner. If desired, the vehicle need not carry a top.

I prefer to provide a chassis frame for the motor vehicle, the frame being adapted to receive and support my improved body structure although, if desired, the body and frame structure may be built as a unitary structure. The chassis frame is illustrated in construction lines in Fig. 2 in order to avoid confusion with the body frame, the chassis frame comprising any suitable structure preferably including the generally longitudinally extending side rails or sills 14 connected below the driver's compartment by an X-brace structure consisting of the V-shaped diagonal members 15 having their flattened apices 16 spaced transversely to accommodate the usual propeller shaft (not shown) for driving the rear wheels from the engine. Such parts are not illustrated since they are well known in the art. The diagonal members 15 have their legs welded or otherwise secured to the side sills 14. For the most part, only one side of my body structure and frame parts will be shown and described since the structure is symmetrical about the longitudinal central plane of the vehicle. The front and rear ground wheels (not shown) are sprung with the chassis frame in any well known manner as described.

If desired the frame 14, 15 may be a part of a body structure of the closed or open part instead or in the nature of what is commonly called a chassis frame.

The body sections A and B are rigidly braced together against relative movement in any direction by reason of a frame structure or sub-frame comprising the main longitudinal side sills or rails 17 adapted to conform with the upper faces of chassis rails 14, a bracket 18 which is Z-shaped in cross section being interposed between each chassis rail 14 and body rail 17. The bracket 18 thus has the outwardly extending flange 19 and the inwardly extending flange 20, suitable fastener assemblies 21 being provided at suitable intervals to secure the upper flange of rail 14 to the lower flange of rail 17 with flange 20 secured therebetween.

The rail 17 is a channel opening inwardly and has welded thereto an inwardly opening component channel member 22 forming a hollow box-like structure of relatively great strength and of light weight for rail 17. The rails 17 are connected beyond the ends of channel 22 by an X-brace structure generally overlying the X-brace of the chassis structure. Thus, each of the rails 17 has welded thereto the forward outwardly channeled end 23 of the oblique member 24 and at the rear of channel 22 each rail 17 has welded thereto the rear outwardly channeled end 25 of the oblique member 26, the member 24 being obliquely aligned with a member 26 to provide the X-brace. The members 26 are stiffened laterally by connecting them together intermediate their ends by a cross-brace 27 welded in position and at a height sufficient to accommodate the propeller shaft.

The adjacent members 24 and 26 are connected through a stiffener channel 28 having forwardly and rearwardly diverging arm portions 29 and 30 respectively welded to members 24 and 26 to form hollow beams therewith. The members 24 and 26 are braced with a rail 17 by the vertical channel plates 30, 31 welded in place adjacent the respective connections of said members to rail 17.

At the center region of the body X-brace structure, the inner end regions of oblique members 24 and 26 are transversely arched and welded together to provide a rigid tunnel to accommodate the propeller shaft and the usual displacement thereof relative to the body. Thus, as shown in Fig. 4, the lower flanges of the members 24 are arched at 32 and welded to the upper flanges 33 (and to the corresponding upper flanges of the members 26) is the horizontal top central stiffening plate 34 for the body X-brace. The central region of the X-brace is further reinforced by an arched lower plate member 35 welded to the arched flanges 32 (and to the corresponding arched flanges of the members 26), the plate 35 having ends bent downwardly at 36 and then forwardly and rearwardly to provide marginal stiffening flanges 37, 38. The latter flanges also continue at the sides to provide lateral flanges 39 which are welded to the lower flanges of oblique members 24, 26 and which are seated on the chassis oblique members 15.

The body frame or sub-frame structure as thus far described is adapted to form a unitary part of the body structure and is preferably removably attached to the chassis frame at a plurality of points by a connecting assembly generally designated at 40. A typical connector is shown in Fig. 5 and includes the threaded bolt 41 and associated nut 42, complementary spacers 43 bracing the horizontal and vertical flanges of the hollow beams when the nut 42 is tightened.

By connecting the body X-brace rigidly to the chassis X-brace, as by the bolts and spacers 43, approximately at the general region mid-way across these braces, I obtain the effect of a full depth of the two X-braces near the center of these braces.

The forward end of the body X-frame structure is adapted to provide a rigid bracing for the dash, windshield, door pillar and other parts of the forward body section A as follows.

As shown in Fig. 3 the inner channel 23 has its web dished laterally outwardly at the fastener 21 to accommodate this fastener. A stepped angle bracket 45 has a flange 44 which is welded to the side of rail 17 and is bent inwardly at 45ª beneath the same to lie between the bracket 18 as shown in Fig. 3A, the bracket flange 44 at section 3—3 being spaced from rail 17 to meet the outer cowl panel hereinafter referred to. The aforesaid fasteners 21 also serve to secure the inwardly bent flange 45ª to rails 14 and 17. This bracket is formed with an inclined shelf or step 48 which connects flange 44 with a further flange 47, these flanges merging where the step 48 is discontinued approximately at the point 45ᵇ shown in Fig. 1 in order to accommodate the diagonal windshield brace hereinafter referred to. The step 48 supports the transverse toe-board 49.

Flange 47 of bracket 45 has its rear edge bent outwardly at 52 for welding to the flange 53 of the outer body cowl panel 54 to provide a pillar or post 55 for swingingly supporting door C by hinges, one of which is shown at 56 in Fig. 1. The cowl panel 54 then extends forwardly and is secured to the forward edge portion of bracket 45 and therebeyond to the dash hereinafter referred to for providing a rigid reinforcing structure.

The windshield 11 has its side post 57 welded to pillar 55 and to the forwardly extending ribbed brace plate 58, the brace 58 and post 57 having welded thereto the upper bent end 59 of the oblique channeled brace 60 which, in effect, provides a continuation of windshield post 11. The brace 58 welds to the dash 66 in any suitable manner as by the brace flanges 58ª. The toe-board 49 is cut-out at 61 to permit brace 60 to extend therebelow. The shelf 48 discontinues at 45ᵇ to permit brace 60 to extend therebelow, this brace having its rear flange bent to provide a terminal flange 62 welded to the upper face of rail 17. The lower end 63 of the front flange is bent to conform with the front end of rail 17 for welding thereto while the lower end 64 of the web or brace 60 welds to the side end portion of rail 17.

The transverse metal dash 66 has a stiffening rib 67 formed therein above the inclined flange 68 which supports the forward edge of the toe-board 49. The flange 69 has the side flanges 68ª which respectively weld to one of the side inclined braces 60. In this manner it will be noted that the front section A has its parts rigidly braced with the body X-frame to prevent any objectionable movement of any part relative to the body X-frame.

The rear post or pillar 69 for door C has the outer panel 54a welded thereto and for rigidly connecting this post to the sill 17 I have provided a bracket or gusset member 70 having a lower horizontal flange 71, transverse forward flange 72 and side flange 73. The flange 71 is welded to the upper face of rail 17 and side flange 73 forms the outer wall of pillar 69 at the lower end thereof. It will be noted that the lower end of pillar 69 depends below rail 17 and is welded to the outer face thereof and to a portion of the underface as best seen in Fig. 6. Each flange 72 has welded thereto a diagonal brace 74 which extends across the body (see Fig. 7) to a bracket 75 at the top of the opposite door pillar. Brackets 75 are connected transversely by the shelf-like bracing 76 which, as shown in Fig. 7, extends rearwardly of pillars 69 and upwardly by a rear wall 77. This shelf brace 76 is supported from gussets 79 by channeled brackets 78 each being welded in place to brace 76 and to a side flange 73. The diagonal braces 74 provide a support for the back of the seat 79 shown in dotted lines in Fig. 1 as well as providing a rigid cross bracing for the rear section B. A portion of the steel floor 80 is shown in Fig. 2, this floor welding to the upper parts of the body bracing diagonal members 24 and 26 and rails 17 to further add rigidity thereto. The floor has suitable depressions to conform with the slightly different levels of the upper surfaces of the members of the body X-brace structure and side rails. In order to rigidly support floor 80 together with such accessories as the usual storage battery (not shown) I provide at each side of the body X-brace structure the lateral channels 81 and 82 (see Figs. 1 and 2) the ends of which weld within the channeled faces of channels 22 and the arm portions 29 and 30 of channel 28.

The body sections A and B are each rigidly braced and rigidly connected by the X-frame structure against any relative weaving or deflections as has heretofore been objectionable and characteristic of the types of vehicle bodies referred to hereinbefore. The body sections cannot relatively twist in any noticeable manner or relatively deflect longitudinally, laterally, or vertically. Also, the windshield and door columns are rigidly connected to the body frame structure and objectionable displacement of these parts is also prevented. The chassis, when provided, may be relatively light since it is rigidly reinforced by the body sub-frame.

Various modifications and changes will be apparent from the teachings of my invention, as set forth in the appended claims, and it is not my intention to limit my invention to the particular details of construction and operation shown and described for illustrative purposes.

What I claim is:

1. In an open type body structure of the character described having a forward cowl section and a rear section providing a driver's compartment therebetween, a chassis structure having transversely braced longitudinally extending rails, a body frame structure connecting said body sections as a unit, said body frame structure including a substantially X-brace, and means for rigidly securing said transverse chassis bracing to the X-brace of said body frame structure.

2. In an open type body structure of the character described having a forward cowl section and a rear section providing a driver's compartment therebetween, a chassis structure having longitudinally extending rails, a transversely braced body frame structure connecting said body sections as a unit, said chassis structure including an X-brace below said compartment, and means for securing said transverse body frame bracing to the X-brace of said chassis structure.

3. In an open type body structure of the character described having a forward cowl section and a rear section providing a driver's compartment therebetween, a chassis structure having longitudinally extending rails, a body frame structure connecting said body sections as a unit, means for securing said unit to said chassis structure, said chassis structure including an X-brace below said compartment, and said body frame structure including an X-brace supported by said chassis X-brace.

4. In a motor vehicle of the character described having front and rear body sections providing an open driver's compartment therebetween, said front section having a windshield structure, a bottom frame structure having side sills rigidly connecting said body sections, upwardly inclined side braces structurally connecting said windshield structure to said side sills, and an angle bracket connecting each of said inclined braces to an associated side sill, each of said brackets having an inclined stepped portion for supporting a toe-board, said stepped portions being interrupted to accommodate said inclined side braces.

5. In a motor vehicle of the character described having front and rear body sections providing an open driver's compartment therebetween, said front section having a windshield structure, a bottom frame structure having side sills rigidly connecting said body sections, means including spaced upright side braces for structurally connecting said windshield structure to said side sills, an angle bracket connecting each of said inclined braces to an associated side sill, each of said brackets having an inclined stepped portion for supporting a toe-board, said stepped portions being interrupted to accommodate said inclined side braces, and front side door pillars extending upwardly from said sills and having their upper ends rigidly secured to said side braces respectively.

6. In a motor vehicle of the character described having front and rear body sections providing an open driver's compartment therebetween, a frame structurally connecting said sections and including upper and lower pairs of side rails, said lower rails extending longitudinally beyond said upper rails, said frame including an X-brace between each of said pairs of rails, said X-braces being formed centrally with a propeller shaft tunnel.

7. In a body structure of the character described having front and rear upstanding sections, a body frame structure connecting said sections as a unit and including longitudinally extending side sills, a chassis structure adapted to support said unit and having longitudinally extending side rails, members extending obliquely inwardly from said rails and having their inner end portions spaced apart to accommodate a propeller shaft, members extending obliquely inwardly from said sills and having their inner ends connected together at approximately a point mid-way across the body frame structure.

8. In a body structure of the character described having front and rear upstanding sections, a body frame structure connecting said sections as a unit and including longitudinally extending side sills, a chassis structure adapted to support said unit and having longitudinally extending side rails, members extending obliquely inwardly from said rails and having their inner end portions spaced apart to accommodate a propeller shaft, members extending obliquely inwardly from said sills and having their inner ends extending above and inwardly beyond said inner end portions of said oblique rail members, and means connecting the inner ends of said oblique sill members to said inner end portions of said oblique rail members.

9. In a body structure of the character described having front and rear upstanding sections, a body frame structure connecting said sections as a unit and including longitudinally extending side sills, a chassis structure adapted to support said unit and having longitudinally extending side sills, members extending obliquely inwardly from said rails and having their inner end portions spaced apart to accommodate a propeller shaft, members extending obliquely inwardly from said sills and having their inner ends arched above said inner end portions of said oblique rail members and extending inwardly therebeyond for connection at approximately a point mid-way across the body structure.

10. In a body structure of the character described having front and rear upstanding sections, a body frame structure connecting said sections as a unit and including longitudinally extending side sills, a chassis structure adapted to support said unit and having longitudinally extending side rails, a pair of substantially V-shaped members having their legs respectively connected to said rails and having their apices spaced to accommodate a propeller shaft, a substantially X-shaped brace connecting said sills, and means for rigidly connecting said legs of the V-shaped members to the arms of the X-shaped brace adjacent the center of the X-shaped brace.

11. In a motor vehicle having a chassis frame including a transverse brace, a body structure supported by said chassis frame and including a transverse brace superimposed on said frame brace, one of said braces comprising a hollow beam, a bolt extending through said hollow beam for connection to the other of said braces, and a pair of complementary spacers adjacent said bolt for bracing said hollow beam.

12. In a motor vehicle having a chassis frame including a transverse brace, a body structure supported by said chassis frame and including a transverse brace superimposed on said frame brace, one of said braces comprising a hollow beam, a bolt extending through said hollow beam for connection to the other of said braces, and spacer means adjacent said bolt for bracing said hollow beam.

JAMES C. ZEDER.